United States Patent
Chen et al.

(10) Patent No.: US 9,879,105 B2
(45) Date of Patent: Jan. 30, 2018

(54) POLYOLEFIN COMPOSITION AND METHOD OF PRODUCING THE SAME

(71) Applicant: Dow Global Technologies LLC, Midland, MI (US)

(72) Inventors: Linfeng Chen, Missouri City, TX (US); Stephanie M. Whited, South Charleston, WV (US); Robert J. Jorgensen, Fort Bragg, CA (US)

(73) Assignee: Dow Global Technologies LLC

( * ) Notice: Subject to any disclaimer, the term of this patent is extended or adjusted under 35 U.S.C. 154(b) by 0 days.

(21) Appl. No.: 15/025,366

(22) PCT Filed: Oct. 30, 2014

(86) PCT No.: PCT/US2014/063182
§ 371 (c)(1),
(2) Date: Mar. 28, 2016

(87) PCT Pub. No.: WO2015/073221
PCT Pub. Date: May 21, 2015

(65) Prior Publication Data
US 2016/0340453 A1   Nov. 24, 2016

Related U.S. Application Data

(60) Provisional application No. 61/904,883, filed on Nov. 15, 2013.

(51) Int. Cl.
*C08F 210/16*   (2006.01)
(52) U.S. Cl.
CPC .................................. *C08F 210/16* (2013.01)
(58) Field of Classification Search
None
See application file for complete search history.

(56) References Cited

U.S. PATENT DOCUMENTS

| | | | |
|---|---|---|---|
| 7,935,766 B2 * | 5/2011 | Sheard | C08F 10/06 525/247 |
| 2011/0124491 A1 * | 5/2011 | Chen | C08F 10/06 502/123 |

OTHER PUBLICATIONS

POE (15) coco fatty acids ester Safety Data Sheet (2014).*
EPA Synonyms of CAS No. 61791-29-5 (2017).*
Sax, N. Irving, et at., "Stoichiometry", Haley's Condensed Chemical Dictionary, 1987, p. 1095 along with title and bibliographic pages.

* cited by examiner

*Primary Examiner* — Catherine S Branch

(57) ABSTRACT

The instant invention provides a polyolefin composition, a catalyst composition, and a method of producing the same. The method for polymerizing one or more polyolefins according to the present invention comprises the steps of: (1) selecting a first olefin monomer and optionally one or more alpha-olefin comonomers; (2) selecting one or more catalyst systems comprising one or more procatalysts comprising a first metal selected from the group consisting of Ti, V, Hf, Zr, and combinations or mixture two or more thereof, one or more cocatalysts comprising Al, and one or more self-limiting agents (SLA) selected from the group consisting of polyether, polyester, and combinations or mixtures thereof; wherein the ratio of said SLA to said first metal (SLA:first metal) is from 0.1:1 to 30:1; (3) polymerizing said first olefin monomer and optionally one or more alpha-olefin comonomers in the presence of said one or more catalyst systems via a slurry polymerization process or gas-phase polymerization process in one or more reactors; (4) thereby producing one or more olefin-based polymers; (5) wherein said catalyst system has a loss of least 85 percent of catalyst activity when the temperature is increased from 85 to 110° C.

7 Claims, No Drawings

POLYOLEFIN COMPOSITION AND METHOD OF PRODUCING THE SAME

FIELD OF INVENTION

The instant invention relates to a polyolefin composition, a catalyst composition, and method of producing the same.

BACKGROUND OF THE INVENTION

Olefin (co)polymerization, for example ethylene (co)polymerization, typically operates at a temperature that is close to the softening temperature of the resultant (co)polymer. Insufficient heat removal can easily lead to temperature exceeding the softening temperature and cause (co)polymer agglomeration that may disrupt production continuity.

In a gas phase polymerization process, the polymerization reactor is cooled by the circulating monomer gasses to maintain a steady operating temperature. However, if the temperature of a growing resin particle approaches the sticking/melting point of the resin, resin sheeting on the reactor walls may occur. Growing resin particles are especially susceptible to overheating if they accumulate at the reactor walls, thereby losing heat-transfer with the circulating monomer gasses, and remaining in close contact with respect to each other. In such instances, particle-particle fusion may occur, followed by reactor sheeting, which, in turn, could cause reactor shutdown.

The currently available catalyst systems fail to address such heat removal concerns in olefin polymerization processes such as ethylene polymerization systems. Therefore, there is a need for a catalyst system having an effective mechanism that substantially reduces catalyst activity within a narrow temperature range and therefore reducing heat generation when the temperature in various parts of the reactor system approaches (co)polymer softening temperature to prevent agglomeration formation and minimizing production disruptions.

SUMMARY OF THE INVENTION

The instant invention provides a polyolefin composition, a catalyst composition, and method of producing the same.

In a first embodiment, the instant invention provides a method for polymerizing one or more olefins comprising the steps of: (1) selecting a first olefin monomer and optionally one or more alpha-olefin comonomers; (2) selecting one or more catalyst systems comprising one or more procatalysts comprising a first metal selected from the group consisting of Ti, V, Hf, Zr, and combinations or mixture of two or more thereof, one or more cocatalysts comprising Al, and one or more self-limiting agents (SLA) selected from the group consisting of polyether, polyester, and combinations or mixtures thereof; wherein the ratio of said SLA to said first metal (SLA:first metal) is from 0.1:1 to 30:1; (3) polymerizing said first olefin monomer and optionally one or more alpha-olefin comonomers in the presence of said one or more catalyst systems via a slurry polymerization process or gas-phase polymerization process in one or more reactors; (4) thereby producing one or more olefin-based polymers; (5) wherein said catalyst system has a loss of at least 85 percent of catalyst activity when the temperature is increased from 85 to 110° C.

In an alternative embodiment, the instant invention further provides a catalyst composition comprising one or more catalyst systems comprising one or more procatalysts comprising a first metal selected from the group consisting of Ti, V, Hf, Zr, and combinations or mixture of two or more thereof, one or more cocatalysts comprising Al, and one or more self-limiting agents (SLA) selected from the group consisting of polyether, polyester, and combinations or mixtures thereof; wherein the ratio of said SLA to said first metal (SLA:first metal) is from 0.1:1 to 30:1.

In an alternative embodiment, the instant invention further provides a polyolefin composition comprising the polymerization reaction product of the first embodiment described above.

In an alternative embodiment, the instant invention provides a polyolefin composition, a catalyst composition, a method of producing the same, in accordance with any of the preceding embodiments, except that the SLA is a polyether selected from group consisting of poly(ethylene glycol) diester, poly(ethylene glycol) mono-ester, poly(ethylene glycol) diether, poly(ethylene glycol) mono-ether, poly(ethylene glycol), poly(propylene glycol) diester, poly(propylene glycol) mono-ester, poly(propylene glycol) diether, poly(propylene glycol) mono-ether, poly(propylene glycol), and poly(vinyl ether).

In an alternative embodiment, the instant invention provides a polyolefin composition, a catalyst composition, a method of producing the same, in accordance with any of the preceding embodiments, except that the SLA is a polyether selected from group consisting of poly(ethylene glycol) diester, and poly(vinyl ether).

In an alternative embodiment, the instant invention provides a polyolefin composition, a catalyst composition, a method of producing the same, in accordance with any of the preceding embodiments, except that the SLA is a polyether selected from group consisting of poly(ethylene glycol) dilaurate, and poly(ethyl vinyl ether).

In an alternative embodiment, the instant invention provides a polyolefin composition, a catalyst composition, a method of producing the same, in accordance with any of the preceding embodiments, except that the SLA is polyester.

In an alternative embodiment, the instant invention provides a polyolefin composition, a catalyst composition, a method of producing the same, in accordance with any of the preceding embodiments, except that the polyester is poly (vinyl ester).

In an alternative embodiment, the instant invention provides a polyolefin composition, a catalyst composition, a method of producing the same, in accordance with any of the preceding embodiments, except that the poly(vinyl ester) is selected from the group consisting of poly(vinyl laurate), poly(vinyl myristate), poly(vinyl palmitate), and poly(vinyl stearate).

In an alternative embodiment, the instant invention provides a polyolefin composition, a catalyst composition, a method of producing the same, in accordance with any of the preceding embodiments, except that the poly(vinyl ester) is poly(vinyl stearate).

In an alternative embodiment, the instant invention provides a composition, a catalyst composition, a method of producing the same, in accordance with any of the preceding embodiments, except that the first olefin monomer is selected from the group consisting of ethylene, propylene, and 1-butene.

In an alternative embodiment, the instant invention provides a polyolefin composition, a catalyst composition, method of producing the same, in accordance with any of the preceding embodiments, except that the polyolefin is a polyethylene, polypropylene, or polybutene.

DETAILED DESCRIPTION OF THE INVENTION

The instant invention provides a polyolefin composition, a catalyst composition, and method of producing the same.

In a first embodiment, the instant invention provides a method for polymerizing one or more polyolefins comprising the steps of: (1) selecting a first olefin monomer and optionally one or more alpha-olefin comonomers; (2) selecting one or more catalyst systems comprising one or more procatalysts comprising a first metal selected from the group consisting of Ti, V, Hf, Zr, and combinations or mixture of two or more thereof, one or more cocatalysts comprising Al, and one or more self-limiting agents (SLA) selected from the group consisting of polyether, polyester, and combinations or mixtures thereof; wherein the ratio of said SLA to said first metal (SLA:first metal) is from 0.1:1 to 30:1; (3) polymerizing said first olefin monomer and optionally one or more alpha-olefin comonomers in the presence of said one or more catalyst systems via a slurry polymerization process or gas-phase polymerization process in one or more reactors; (4) thereby producing one or more olefin-based polymers; (5) wherein said catalyst system has a loss of least 85 percent of catalyst activity when the temperature is increased from 85 to 110° C.

In an alternative embodiment, the instant invention further provides a catalyst composition comprising one or more catalyst systems comprising one or more procatalysts comprising a first metal selected from the group consisting of Ti, V, Hf, Zr, and combinations or mixtures of two or more thereof, one or more cocatalysts comprising Al, and one or more self-limiting agents (SLA) selected from the group consisting of polyether, polyester, and combinations or mixtures thereof; wherein the ratio of said SLA to said first metal (SLA:first metal) is from 0.1:1 to 30:1.

In an alternative embodiment, the instant invention further provides a polyolefin composition comprising the polymerization reaction product of the first embodiment described above.

In an alternative embodiment, the instant invention provides a polyolefin composition, a catalyst composition, a method of producing the same, in accordance with any of the preceding embodiments, except that the SLA is a polyether selected from group consisting of poly(ethylene glycol) diester, poly(ethylene glycol) mono-ester, poly(ethylene glycol) diether, poly(ethylene glycol) mono-ether, poly(ethylene glycol), poly(propylene glycol) diester, poly(propylene glycol) mono-ester, poly(propylene glycol) diether, poly(propylene glycol) mono-ether, poly(propylene glycol), and poly(vinyl ether).

In an alternative embodiment, the instant invention provides a polyolefin composition, a catalyst composition, a method of producing the same, in accordance with any of the preceding embodiments, except that the SLA is a polyether selected from group consisting of poly(ethylene glycol) diester, and poly(vinyl ether).

In an alternative embodiment, the instant invention provides a polyolefin composition, a catalyst composition, a method of producing the same, in accordance with any of the preceding embodiments, except that the SLA is a polyether selected from group consisting of poly(ethylene glycol) dilaurate, and poly(ethyl vinyl ether).

In an alternative embodiment, the instant invention provides a polyolefin composition, a catalyst composition, a method of producing the same, in accordance with any of the preceding embodiments, except that the SLA is polyester.

In an alternative embodiment, the instant invention provides a polyolefin composition, a catalyst composition, a method of producing the same, in accordance with any of the preceding embodiments, except that the polyester is poly (vinyl ester).

In an alternative embodiment, the instant invention provides a polyolefin composition, a catalyst composition, a method of producing the same, in accordance with any of the preceding embodiments, except that the poly(vinyl ester) is selected from the group consisting of poly(vinyl laurate), poly(vinyl myristate), poly(vinyl palmitate), and poly(vinyl stearate).

In an alternative embodiment, the instant invention provides a polyolefin composition, a catalyst composition, a method of producing the same, in accordance with any of the preceding embodiments, except that the poly(vinyl ester) is poly(vinyl stearate).

In an alternative embodiment, the instant invention provides a polyolefin composition, a catalyst composition, a method of producing the same, in accordance with any of the preceding embodiments, except that the first olefin monomer is selected from the group consisting of ethylene, propylene, and 1-butene.

In an alternative embodiment, the instant invention provides a polyolefin composition, a catalyst composition, a method of producing the same, in accordance with any of the preceding embodiments, except that the polyolefin is a polyethylene, polypropylene, or polybutene.

One aspect of the invention provides a method of minimizing or eliminating reactor sheeting in a two-stage polyethylene polymerization which produces a polyethylene having a high molecular weight fraction, the method comprising introducing one or more self-limiting agents, according to the present invention.

Another aspect of the invention provides a method of minimizing or eliminating reactor sheeting in a single stage polyethylene polymerization which produces a polyethylene, the method comprising introducing one or more self-limiting agents, according to the present invention.

Embodiments of the invention provide methods utilizing self-limiting agents that will cause a loss of at least 85% of catalyst activity when the reaction temperature is increased from 85 to 110° C. In a further embodiment, the invention provides methods utilizing self-limiting agents that will cause a loss of at least 80% of catalyst activity when the reaction temperature is increased from 95 to 110° C. In another embodiment, the invention provides methods utilizing self-limiting agents that will cause a loss of at least 90% of catalyst activity when the reaction temperature is increased from 95 to 110° C.

Embodiments of the invention provide methods utilizing self-limiting agents that will cause a loss of at least 35% of catalyst activity when the reaction temperature is increased from 85 to 110° C. In a further embodiment, the invention provides methods utilizing self-limiting agents that will cause a loss of at least 50% of catalyst activity when the reaction temperature is increased from 85 to 110° C. Embodiments of the invention provide methods utilizing self-limiting agents that will cause a loss of at least 55%, or at least 70%, or at least 80%, or at least 90% of catalyst activity when the reaction temperature is increased from 85 to 110° C.

Embodiments of the invention provide methods utilizing self-limiting agents that will cause a loss of at least 20% of catalyst activity at 100° C. compared to the catalyst systems without using self-limiting agents under the same polymerization conditions at the same temperature. Embodiments of the invention provide methods utilizing self-limiting agents that will cause a loss of at least 40%, or at least 50%, or at least 60%, or at least 70%, or at least 80%, or at least 90% of catalyst activity at 100° C. compared to the catalyst systems without using self-limiting agents under the same polymerization conditions at the same temperature.

Embodiments of the invention provide methods utilizing self-limiting agents that will cause a loss of at least 20% of catalyst activity at 110° C. compared to the catalyst systems without using self-limiting agents under the same polymerization conditions at the same temperature. Embodiments of the invention provide methods utilizing self-limiting agents that will cause a loss of at least 40%, or at least 50%, or at least 60%, or at least 70%, or at least 80%, or at least 90% of catalyst activity at 110° C. compared to the catalyst systems without using self-limiting agents under the same polymerization conditions at the same temperature.

One aspect of the invention provides a method of minimizing or eliminating reactor sheeting for high activity catalysts. Catalyst particles of a high activity catalyst are more susceptible to overheating when heat removal is not adequate. In some embodiments of the invention, the catalyst activity is higher than 3.0 kg polyolefin/g catalyst-hr, or higher than 5.0 kg polyolefin/g catalyst-hr, or higher than 7.0 kg polyolefin/g catalyst-hr, or higher than 10.0 kg polyolefin/g catalyst-hr.

Another aspect of the invention utilizes self-limiting agents which, while minimizing or eliminating reactor wall sheeting, do not negatively impact the physical properties of the polyolefin resin, e.g. polyethylene, in comparison to those of polyolefin resin, e.g. polyethylene, produced in the absence of the self-limiting agent.

In some aspects of the invention, the self-limiting agent is mixed with a cocatalyst feed and introduced into the reactor. In alternative embodiments of the invention, the self-limiting agent is introduced into the reactor separately from the cocatalyst feed.

In some embodiments of the invention, the self-limiting agent is a polyether selected from group consisting of poly(ethylene glycol) diester, poly(ethylene glycol) mono-ester, poly(ethylene glycol) diether, poly(ethylene glycol) mono-ether, poly(ethylene glycol), poly(propylene glycol) diester, poly(propylene glycol) mono-ester, poly(propylene glycol) diether, poly(propylene glycol) mono-ether, poly (propylene glycol), and poly(vinyl ether).

In some embodiments of the invention, the self-limiting agent is a polyether selected from group consisting of poly(ethylene glycol) diester, and poly(vinyl ether).

In some embodiments of the invention, the self-limiting agent is a polyether selected from group consisting of poly(ethylene glycol) dilaurate, and poly(ethyl vinyl ether).

In some embodiments of the invention, the self-limiting agent is polyester.

In some embodiments of the invention, the self-limiting agent is poly(vinyl ester).

In some embodiments of the invention, the self-limiting agent is a poly(vinyl ester) is selected from the group consisting of poly(vinyl laurate), poly(vinyl myristate), poly (vinyl palmitate), and poly(vinyl stearate).

In some embodiments of the invention, the self-limiting agent is a poly(vinyl ester) is poly(vinyl stearate).

In some embodiments of the invention, the self-limiting agent is a polyether comprising at least 3 repeating ether units, or at least 5 repeating ether units, or at least 10 repeating ether units, or at least 20 repeating ether units, or at least 50 repeating ether units.

In some embodiments of the invention, the self-limiting agent is a polyester comprising at least 3 repeating ether units, or at least 5 repeating ether units, or at least 10 repeating ether units, or at least 20 repeating ether units, or at least 50 repeating ether units.

In one embodiment, the polyether or polyester self-limiting agent is a liquid at room temperature to facilitate its introduction into the polymerization reactor in a consistent and accurate manner. In one embodiment, the polyether or polyester self-limiting agent is miscible with aliphatic hydrocarbon compounds in order to avoid phase separation in the polymerization reactor.

Within the scope of the present application, the term "procatalyst" or "precursor", used interchangeably herein, denotes a compound comprising a ligand, a transition metal, and optionally an electron donor. The procatalyst may further undergo halogenation by contacting with one or more halogenating agents. A procatalyst can be converted into a catalyst upon activation. Such catalysts are commonly referred to as Ziegler-Natta catalysts. Suitable Zeigler-Natta catalysts are known in the art and include, for example, the catalysts taught in U.S. Pat. Nos. 4,302,565; 4,482,687; 4,508,842; 4,990,479; 5,122,494; 5,290,745; and, 6,187,866 B1, the disclosures of which are hereby incorporated by reference. The collection of catalyst components, such as procatalyst(s), cocatalyst(s), and optionally self-limiting agent(s), is referred to as a catalyst system.

The transition metal compound of the procatalyst composition can comprise compounds of different kinds. The most usual are titanium compounds—organic or inorganic—having an oxidation degree of 3 or 4. Other transition metals such as, vanadium, zirconium, hafnium, chromium, molybdenum, cobalt, nickel, tungsten and many rare earth metals are also suitable for use in Ziegler-Natta catalysts. The transition metal compound is usually a halide or oxyhalide, an organic metal halide or purely a metal organic compound. In the last-mentioned compounds, there are only organic ligands attached to the transition metal.

The procatalyst can have the formula $Mg_d Me(OR)_e X_f (ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is >1 to 1.5(d). Me is a transition metal selected from the group of titanium, zirconium, hafnium and vanadium. Some specific examples of suitable titanium compounds are: $TiCl_3$, $TiCl_4$, $Ti(OC_2H_5)_2Br_2$, $Ti(OC_6H_5)Cl_3$, $Ti(OCOCH_3)Cl_3$, $Ti(acetylacetonate)_2Cl_2$, $TiCl_3(acetylacetonate)$, and $TiBr_4$. $TiCl_3$ and $TiCl_4$ are preferred titanium compounds.

The magnesium compounds include magnesium halides such as $MgCl_2$, $MgBr_2$, and $MgI_2$. Anhydrous $MgCl_2$ is a preferred compound. Other compounds useful in the invention are $Mg(OR)_2$, $Mg(OCO_2Et)$ and MgRCl where R is defined above. About 0.5 to about 56, and preferably about 1 to about 20, moles of the magnesium compounds are used per mole of transition metal compound. Mixtures of these compounds may also be used.

The procatalyst compound can be recovered as a solid using techniques known in the art, such as precipitation of the procatalyst or by spray drying, with or without fillers. Spray drying is a particularly preferred method for recovery of the procatalyst compound.

Spray drying is taught in U.S. Pat. No. 5,290,745 and is incorporated by reference. A further procatalyst comprising magnesium halide or alkoxide, a transition metal halide, alkoxide or mixed ligand transition metal compound, an electron donor and optionally a filler can be prepared by spray drying a solution of said compounds from an electron donor solvent.

The electron donor is typically an organic Lewis base, liquid at temperatures in the range of about 0° C. to about 200° C., in which the magnesium and transition metal compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl mono-ethers having 2 to 20 carbon atoms; dialkyl, diaryl, and alkylaryl ketones having 3 to 20 carbon atoms; and alkyl, alkoxy, and alkyl-alkoxy esters of alkyl and aryl carboxylic acids having 2 to 20 carbon atoms. Mono-ether is defined herein as a compound that contains only one ether functional group in the molecule. For ethylene homo and co-polymerization, the most preferred electron donor is tetrahydrofuran. Other examples of suitable electron donors are methyl formate, ethyl acetate, butyl acetate, ethyl ether, dioxane, di-n-propyl ether, dibutyl ether, ethanol, 1-butanol, ethyl formate, methyl acetate, ethyl anisate, ethylene carbonate, tetrahydropyran, and ethyl propionate. Further examples of suitable electron donors include compounds containing 2 functional groups separated by 2 to 4 carbon atoms. The functional groups are selected from carboxylate, amide, and ether. The 2 functional group can be the same or different. Examples of the compounds containing 2 functional groups include phthalates, succinates, maleates, malonates, glutarates, diethers, 1,2-dialkoxybenzenes, diol esters, 1,2-phenylene diesters, and amidoalkyl ester. It is believed that in addition to functioning as internal electron donors in the procatalysts, these compounds containing 2 functional groups also impart a certain degree of self-limiting capability to the catalyst system.

While an excess of electron donor may be used initially to provide the reaction product of transition metal compound and electron donor, the reaction product finally contains about 1 to about 20 moles of electron donor per mole of transition metal compound and preferably about 1 to about 10 moles of electron donor per mole of transition metal compound.

The ligands comprise halogen, alkoxide, aryloxide, acetylacetonate and amide anions.

Electron donors are also used with procatalysts and cocatalysts for polymerization of propylene and 1-butene to increase isotacticity. These electron donors are also called external electron donors or selectivity control agents. The external electron donors impact both catalyst performance and polymer properties. Suitable external electron donors include alkoxy silanes, carboxylate esters, ethers, amines, ketones, and amides. The mostly commonly used external donors for propylene polymerization include dimethoxysilanes, trimethoxysilanes, diethoxysilanes, triethoxysilanes, and tetraethoxysilan.

Partial activation of the procatalyst can be carried out prior to the introduction of the procatalyst into the reactor. The partially activated catalyst alone can function as a polymerization catalyst but at greatly reduced and commercially unsuitable catalyst productivity. Complete activation by additional cocatalyst is required to achieve full activity. The complete activation occurs in the polymerization reactor via addition of cocatalyst.

The catalyst procatalyst can be used as dry powder or slurry in an inert liquid. The inert liquid is typically a mineral oil. The slurry prepared from the catalyst and the inert liquid has a viscosity measured at 1 sec$^{-1}$ of at least 500 cp at 20° C. Examples of suitable mineral oils are the Kaydol and Hydrobrite mineral oils from Crompton.

In one embodiment in a polymerization process, the procatalyst undergo in-line reduction using reducing agent(s). The procatalyst is introduced into a slurry feed tank; the slurry then passes via a pump to a first reaction zone immediately downstream of a reagent injection port where the slurry is mixed with the first reagent, as described below. Optionally, the mixture then passes to a second reaction zone immediately downstream of a second reagent injection port where it is mixed with the second reagent (as described below) in a second reaction zone. While only two reagent injection and reaction zones are described above, additional reagent injection zones and reaction zones may be included, depending on the number of steps required to fully activate and modify the catalyst to allow control of the specified fractions of the polymer molecular weight distribution. Means to control the temperature of the catalyst procatalyst feed tank and the individual mixing and reaction zones are provided.

Depending on the activator compound used, some reaction time may be required for the reaction of the activator compound with the catalyst procatalyst. This is conveniently done using a residence time zone, which can consist either of an additional length of slurry feed pipe or an essentially plug flow holding vessel. A residence time zone can be used for both activator compounds, for only one or for neither, depending entirely on the rate of reaction between activator compound and catalyst procatalyst.

Exemplary in-line reducing agents are aluminum alkyls and aluminum alkyl chlorides of the formula $AlR_xCl_y$, where $X+Y=3$ and y is 0 to 2 and R is a C1 to C14 alkyl or aryl radical. Such in-line reducing agents include those listed in the following table:

| Reducing Agents | Reducing Agents |
| --- | --- |
| Diethylaluminum chloride | Triethylaluminum |
| Ethylaluminum dichloride | Trimethylaluminum |
| di-isobutyaluminum chloride | Triisobutylaluminum |

-continued

| Reducing Agents | Reducing Agents |
|---|---|
| dimethylaluminum chloride | Tri-n-hexylaluminum |
| Methylaluminum sesquichloride | Tri-n-octylaluminum |
| Ethylaluminum sesquichloride | Dimethylaluminum chloride |

The entire mixture is then introduced into the reactor where the activation is completed by the cocatalyst. Additional reactors may be sequenced with the first reactor, however, catalyst is typically only injected into the first of these linked, sequenced reactors with active catalyst transferred from a first reactor into subsequent reactors as part of the polymer thus produced.

The cocatalysts, which are reducing agents, conventionally used are comprised of aluminum compounds, but compounds of lithium, sodium and potassium, alkaline earth metals as well as compounds of other earth metals than aluminum are possible. The compounds are usually hydrides, organometal or halide compounds. Conventionally, the cocatalysts are selected from the group comprising Al-trialkyls, Al-alkyl halides, Al-alkyl alkoxides and Al-alkyl alkoxy halides. In particular, Al-alkyls and Al-alkyl chlorides are used. These compounds are exemplified by trimethylaluminum, triethylaluminum, tri-isobutylaluminum, tri-n-hexylaluminum, dimethylaluminum chloride, diethylaluminum chloride, ethylaluminum dichloride and diisobutylaluminum chloride, isobutylaluminum dichloride and the like. Butyllithium and dibutylmagnesium are examples of useful compounds of other metals.

Optionally, the slurry may be diluted prior to entering reactor. The diluent can be a mineral oil or an aliphatic hydrocarbon and may be added with the cocatalyst or directly to the reaction zone following the cocatalyst addition.

Ultimately, the activated catalyst is fed into a gas phase reactor in which an olefin polymerization reaction is in progress.

In some aspects of the invention, the self-limiting agent is mixed with and introduced into the reactor with a cocatalyst feed. In alternative embodiments of the invention, the self-limiting agent is introduced into the reactor separately from the cocatalyst feed to the reactor.

The self-limiting property of a catalyst system that comprises SLA(s) depends on the amount of SLA, i.e., SLA/first metal ratio. However, a high SLA/first metal ratio can have a negative impact on catalyst activity, thus limiting the application of a very high SLA/first metal ratio in a commercial production setting. The self-limiting property can also be affected by increasing Al/SLA ratio. In some embodiments, the SLA/first metal ratio can be from 0.1:1 to 30:1, 0.2:1 to 25:1, 1:1 to 20:1, 3:1 to 20:1, 5:1 to 20:1, 10:1 to 20:1, or 1:1 to 20:1.

In other embodiments, The Al/SLA ratio may be 1/1 to 500/1, 1/1 to 100/1, or 2/1 to 40/1, or 3/1 to 30/1, or 4/1 to 20/1, or 5/1 to 15/1, or 6/1 to 12/1, or 7/1 to 10/1.

EXAMPLES

The following examples illustrate the present invention but are not intended to limit the scope of the invention. The examples of the instant invention demonstrate that the use of self-limiting agents according to the present invention reduces catalyst activity at relatively higher temperature, i.e. temperatures near the softening temperature of the polymer, and as a result it reduces potential reactor sheeting.

Self Limiting Agents

SLAs included the following:

| | |
|---|---|
| Abbreviation | PEG-400 DL |
| Compound Name: | Poly(ethylene Glycol) Dilaurate |
| Structure: | $H_3C(H_2C)_9H_2CC(=O)-[OCH_2CH_2]_n-OC(=O)CH_2(CH_2)_9CH_3$ |
| n (average) | 9.1 |
| Physical Form at 25° C. | liquid |
| Soluble in Aliphatic Hydrocarbon | yes |

| | |
|---|---|
| Abbreviation | PEG-600 DL |
| Compound Name: | Poly(ethylene Glycol) Dilaurate |
| Structure: | $H_3C(H_2C)_9H_2CC(=O)-[OCH_2CH_2]_n-OC(=O)CH_2(CH_2)_9CH_3$ |
| n (average) | 13.6 |
| Physical Form at 25° C. | paste |
| Soluble in Aliphatic Hydrocarbon | yes |

| | |
|---|---|
| Abbreviation | PEG-200 DL |
| Compound Name: | Poly(ethylene Glycol) Dilaurate |
| Structure: | $H_3C(H_2C)_9H_2CC(=O)-[OCH_2CH_2]_n-OC(=O)CH_2(CH_2)_9CH_3$ |
| n (average) | 4.5 |
| Physical Form at 25° C. | liquid |
| Soluble in Aliphatic Hydrocarbon | yes |

| | |
|---|---|
| Abbreviation | PEG-400 ML |
| Compound Name: | Poly(ethylene glycol) monolaurate |
| Structure: | H—[OCH$_2$CH$_2$]$_n$—OC(=O)CH$_2$(CH$_2$)$_9$CH$_3$ |
| n (average) | 9.1 |
| Physical Form at 25° C. | liquid |
| Soluble in Aliphatic Hydrocarbon | yes |

| | |
|---|---|
| Abbreviation | PEG(12)C13 |
| Compound Name: | Poly(ethylene glycol) (12) tridecyl ether |
| Structure: | H—[OCH$_2$CH$_2$]$_n$—O(CH$_2$)$_{12}$CH$_3$ |
| n (average) | 12 |
| Physical Form at 25° C. | liquid |
| Soluble in Aliphatic Hydrocarbon | yes |

| | |
|---|---|
| Abbreviation | PPG(69) |
| Compound Name: | Poly(propylene glycol) |
| Structure: | H—[OCH(CH$_3$)CH$_2$]$_n$—OH |
| n (average) | 69 |
| Physical Form at 25° C. | liquid |
| Soluble in Aliphatic Hydrocarbon | yes |

| | |
|---|---|
| Abbreviation | PVS (290) |
| Compound Name: | Poly(vinyl stearate) |
| Structure: | —[CH$_2$C(H)OC(=O)CH$_2$(CH$_2$)$_{15}$CH$_3$]$_n$— |
| n (average) | 29 C |
| Physical Form at 25° C. | liquid |
| Soluble in Aliphatic Hydrocarbon | no |

| | |
|---|---|
| Abbreviation | PEVE (53) |
| Compound Name: | Poly(ethyl vinyl ether) |
| Structure: | —[CH$_2$C(H)OCH$_2$CH$_3$]$_n$— |
| n (average) | 52.7 |
| Physical Form at 25° C. | liquid |
| Soluble in Aliphatic Hydrocarbon | yes |

Preparation of Procatalyst

A titanium trichloride procatalyst is prepared in an approximately 7,500 liter glass lined vessel equipped with pressure and temperature control, and a turbine agitator. A nitrogen atmosphere (<5 ppm H$_2$O) is maintained at all times. Tetrahydrofuran (10,500 lbs, 4,800 kg, <400 ppm H$_2$O) are added to the vessel. The tetrahydrofuran (THF) is recovered from a closed cycle dryer and contained approximately 0.1 percent Mg and 0.3 percent Ti. An 11 percent THF solution of triethylaluminum is added to scavenge residual water. The reactor contents are heated to 40° C., and 13.7 lbs (6 kg) of granular magnesium metal (particle size 0.1-4 mm) is added, followed by 214.5 lbs (97.3 kg) of titanium tetrachloride added over a period of one-half hour.

The mixture is continuously agitated. The exotherm resulting from the addition of titanium tetrachloride causes the temperature of the mixture to rise to approximately 44° C. The temperature is then raised to 70° C. and held at that temperature for approximately four hours, then cooled to 50° C. At the end of this time, 522 pounds (238 kg) of magnesium dichloride are added and heating initiated to raise the temperature to 70° C. The mixture is held at this temperature for another five hours, then cooled to 35° C. and filtered through a 100 mesh (150 μm) filter to remove solids.

Fumed silica (CAB-O-SIL™ TS-610, manufactured by the Cabot Corporation) (811 lbs, 368 kg) is added to the above procatalyst solution over a period of one hour. The mixture is stirred by means of a turbine agitator during this time and for 4 hours thereafter to thoroughly disperse the silica. The temperature of the mixture is held at 40° C. throughout this period and a dry nitrogen atmosphere is maintained at all times. The resulting slurry is spray dried using an 8-foot diameter closed cycle spray dryer equipped with a rotary atomizer. The rotary atomizer is adjusted to give catalyst particles with a D50 on the order of 20-30 μm. The scrubber section of the spray dryer is maintained at approximately +5 to −5° C.

Nitrogen gas is introduced into the spray dryer at an inlet temperature of 140 to 165° C. and is circulated at a rate of approximately 1000-1800 kg/hour. The catalyst slurry is fed to the spray dryer at a temperature of about 35° C. and a rate of 65-150 kg/hour, or sufficient to yield an outlet gas temperature in the range of 100-125° C. The atomization pressure is maintained at slightly above atmospheric. The resulting catalyst particles are mixed with mineral oil under a nitrogen atmosphere in a 400 liter glass lined vessel equipped with a turbine agitator to form a slurry containing approximately 28 percent of the procatalyst. The Ti content in the solid procatalyst is approximately 2.2 to 2.4 wt %.

Polymerization Process for Preparing the Polyethylene Composition

The inventive and comparative polyethylene compositions, ethylene/1-octene copolymers, were produced in accordance with the following general procedure.

Polymerization was carried out in a stirred one-gallon reactor, which was charged with 250 g of 1-octene and 1330 g of Isopar-E. The reactor was heated to a pre-determined temperature, then saturated with ethylene in the presence of 160 mmol hydrogen, and maintained at 135 psi total pressure. The catalyst composition was prepared according to the process described above. Procatalyst, cocatalyst (TEAl), and SLA (if present) were mixed and immediately added to the reactor. After 30 minutes of polymerization time, the bottom valve of the reactor was opened and the content in the reactor was transferred through a transfer tube heated at 150° C. into a glass kettle containing isopropanol. A polymer additive mixture (2:1 IRGAFOS 168:IRGANOX 1010) was added, and the polymer slurry was stirred for even mixing for approximately 10 minutes. Solvent in the mixture was removed via evaporation. The polymer was then dried overnight in a vacuum oven. Ti Efficiency was calculated based on the amount of ethylene consumed (g) per g of Ti.

The present invention may be embodied in other forms without departing from the spirit and the essential attributes thereof, and, accordingly, reference should be made to the appended claims, rather than to the foregoing specification, as indicating the scope of the invention.

TABLE 1

|  | Temp (° C.) | Al/Ti | SLA | SLA/Ti | Ti Efficiency (g ethylene/ g Ti) | Relative Activity Based on Activity at 85° C. | Relative Activity Compared to No SLA |
|---|---|---|---|---|---|---|---|
| Comparative Example 1 | 85 | 150 |  | 0 | 392901 | 1.00 | 1.00 |
|  | 90 | 150 |  | 0 | 371249 | 0.94 | 1.00 |
|  | 95 | 150 |  | 0 | 342321 | 0.87 | 1.00 |
|  | 100 | 150 |  | 0 | 136127 | 0.35 | 1.00 |
|  | 110 | 150 |  | 0 | 101431 | 0.26 | 1.00 |
|  | 125 | 150 |  | 0 | 36497 | 0.09 | 1.00 |
| Inventive Example 1 | 85 | 150 | PEG-400 DL | 0.30 | 384554 | 1.00 | 0.98 |
|  | 90 | 150 | PEG-400 DL | 0.30 | 319493 | 0.83 | 0.86 |
|  | 95 | 150 | PEG-400 DL | 0.30 | 271425 | 0.71 | 0.79 |
|  | 100 | 150 | PEG-400 DL | 0.30 | 78674 | 0.20 | 0.58 |
|  | 110 | 150 | PEG-400 DL | 0.30 | 16866 | 0.04 | 0.17 |
|  | 125 | 150 | PEG-400 DL | 0.30 | 14316 | 0.04 | 0.39 |
| Inventive Example 2 | 85 | 150 | PEG-400 DL | 0.60 | 321139 | 1.00 | 0.88 |
|  | 90 | 150 | PEG-400 DL | 0.60 | 226276 | 0.70 | 0.61 |
|  | 95 | 150 | PEG-400 DL | 0.60 | 54053 | 0.17 | 0.16 |
|  | 100 | 150 | PEG-400 DL | 0.60 | 3772 | 0.01 | 0.03 |
|  | 110 | 150 | PEG-400 DL | 0.60 | 2527 | 0.01 | 0.02 |
|  | 125 | 150 | PEG-400 DL | 0.60 | 3064 | 0.01 | 0.08 |

TABLE 2

|  | Temp (° C.) | Al/Ti | SLA | SLA/Ti | Ti Efficiency (g ethylene/ g Ti) | Relative Activity Based on Activity at 85° C. | Relative Activity Compared to No SLA |
|---|---|---|---|---|---|---|---|
| Comparative Example 2 | 85 | 150 |  | 0 | 363541 | 1.00 | 1.00 |
|  | 100 | 150 |  | 0 | 118265 | 0.33 | 1.00 |
|  | 110 | 150 |  | 0 | 101431 | 0.28 | 1.00 |
|  | 125 | 150 |  | 0 | 36497 | 0.10 | 1.00 |
| Inventive Example 3 | 85 | 250 | PEG-600 DL | 0.60 | 303874 | 1.00 | 0.84 |
|  | 100 | 250 | PEG-600 DL | 0.60 | 2841 | 0.01 | 0.02 |
|  | 110 | 250 | PEG-600 DL | 0.60 | 3062 | 0.01 | 0.03 |
|  | 125 | 250 | PEG-600 DL | 0.60 | 3153 | 0.01 | 0.09 |
| Inventive Example 4 | 85 | 150 | PEG-600 DL | 0.60 | 324107 | 1.00 | 0.89 |
|  | 100 | 150 | PEG-600 DL | 0.60 | 2147 | 0.01 | 0.02 |
|  | 110 | 150 | PEG-600 DL | 0.60 | 2643 | 0.01 | 0.03 |
|  | 125 | 150 | PEG-600 DL | 0.60 | 2835 | 0.01 | 0.08 |

TABLE 3

|  | Temp (° C.) | Al/Ti | SLA | SLA/Ti | Ti Efficiency (g ethylene/ g Ti) | Relative Activity Based on Activity at 85° C. | Relative Activity Compared to No SLA |
|---|---|---|---|---|---|---|---|
| Comparative Example 2 | 85 | 150 |  | 0 | 363541 | 1.00 | 1.00 |
|  | 100 | 150 |  | 0 | 118265 | 0.33 | 1.00 |
| Inventive Example 5 | 85 | 150 | PEG-200 DL | 2.00 | 148067 |  | 0.41 |
|  | 85 | 150 | PEG-200 DL | 5.00 | 123354 |  | 0.34 |
|  | 85 | 150 | PEG-200 DL | 10.00 | 158375 |  | 0.44 |
| Inventive Example 6 | 85 | 150 | PEG-400 DL | 0.05 | 353102 | 1.00 | 0.97 |
|  | 100 | 150 | PEG-400 DL | 0.05 | 131155 | 0.37 | 1.11 |
|  | 85 | 150 | PEG-400 DL | 0.10 | 326654 | 1.00 | 0.90 |
|  | 100 | 150 | PEG-400 DL | 0.10 | 121164 | 0.37 | 1.02 |
|  | 100 | 150 | PEG-400 DL | 0.20 | 12675 |  | 0.11 |
|  | 85 | 150 | PEG-400 DL | 0.60 | 321139 | 1.00 | 0.88 |
|  | 100 | 150 | PEG-400 DL | 0.60 | 3561 | 0.01 | 0.03 |
|  | 85 | 150 | PEG-400 DL | 2.00 | 202842 |  | 0.56 |
|  | 85 | 150 | PEG-400 DL | 5.00 | 139103 |  | 0.38 |
|  | 85 | 150 | PEG-400 DL | 10.00 | 137114 |  | 0.38 |
| Inventive Example 7 | 100 | 150 | PEG-600 DL | 0.06 | 117031 |  | 0.99 |
|  | 100 | 150 | PEG-600 DL | 0.12 | 87885 |  | 0.74 |
|  | 100 | 150 | PEG-600 DL | 0.36 | 24607 |  | 0.21 |
|  | 85 | 150 | PEG-600 DL | 0.60 | 324107 | 1.00 | 0.89 |
|  | 100 | 150 | PEG-600 DL | 0.60 | 2147 | 0.01 | 0.02 |
|  | 85 | 150 | PEG-600 DL | 1.20 | 281227 |  | 0.77 |

TABLE 3-continued

| Temp (° C.) | Al/Ti | SLA | SLA/Ti | Ti Efficiency (g ethylene/ g Ti) | Relative Activity Based on Activity at 85° C. | Relative Activity Compared to No SLA |
|---|---|---|---|---|---|---|
| 85 | 150 | PEG-600 DL | 3.00 | 182530 | | 0.50 |
| 85 | 150 | PEG-600 DL | 6.00 | 175750 | | 0.48 |

TABLE 4

| | Temp (° C.) | Al/Ti | SLA | SLA/Ti | Ti Efficiency (g ethylene/ g Ti) | Relative Activity Based on Activity at 85° C. |
|---|---|---|---|---|---|---|
| Inventive Example 8 | 85 | 150 | PEG-400 ML | 0.40 | 287422 | 1.00 |
| | 100 | 150 | PEG-400 ML | 0.40 | 66086 | 0.23 |
| Inventive Example 9 | 85 | 150 | PEG-400 ML | 0.60 | 239182 | 1.00 |
| | 100 | 150 | PEG-400 ML | 0.60 | 47435 | 0.20 |
| | 110 | 150 | PEG-400 ML | 0.60 | 20287 | 0.08 |
| Inventive Example 10 | 85 | 150 | PEG-400 ML | 1.00 | 240430 | 1.00 |
| | 100 | 150 | PEG-400 ML | 1.00 | 3310 | 0.01 |
| | 110 | 150 | PEG-400 ML | 1.00 | 3490 | 0.01 |
| Inventive Example 11 | 85 | 150 | PEG(12)C13 | 0.40 | 233074 | 1.00 |
| | 100 | 150 | PEG(12)C13 | 0.40 | 18226 | 0.08 |
| | 110 | 150 | PEG(12)C13 | 0.40 | 3437 | 0.01 |
| Inventive Example 12 | 85 | 150 | PEG(12)C13 | 0.60 | 278314 | 1.00 |
| | 100 | 150 | PEG(12)C13 | 0.60 | 3033 | 0.01 |
| Inventive Example 13 | 85 | 150 | PPG(69) | 0.50 | 186766 | 1.00 |
| | 100 | 150 | PPG(69) | 0.50 | 3982 | 0.02 |
| | 110 | 150 | PPG(69) | 0.50 | 3107 | 0.02 |
| Inventive Example 14 | 85 | 150 | PPG(69) | 1.00 | 185935 | 1.00 |
| | 100 | 150 | PPG(69) | 1.00 | 3826 | 0.02 |
| | 110 | 150 | PPG(69) | 1.00 | 3767 | 0.02 |

TABLE 5

| | Temp (° C.) | Al/Ti | SLA | SLA/Ti | Ti Efficiency (g ethylene/ g Ti) | Relative Activity Based on Activity at 85° C. |
|---|---|---|---|---|---|---|
| Inventive Example 15 | 85 | 150 | PVS (290) | 0.20 | 231573 | 1.00 |
| | 100 | 150 | PVS (290) | 0.20 | 29383 | 0.13 |
| Inventive Example 16 | 85 | 150 | PVS (290) | 0.40 | 193735 | 1.00 |
| | 110 | 150 | PVS (290) | 0.40 | 3850 | 0.02 |
| Inventive Example 17 | 85 | 150 | PEVE (53) | 0.15 | 311056 | 1.00 |
| | 100 | 150 | PEVE (53) | 0.15 | 3402 | 0.01 |
| | 110 | 150 | PEVE (53) | 0.15 | 3865 | 0.01 |
| Inventive Example 18 | 85 | 150 | PEVE (53) | 0.25 | 227420 | 1.00 |
| | 100 | 150 | PEVE (53) | 0.25 | 636 | 0.00 |
| | 110 | 150 | PEVE (53) | 0.25 | 4116 | 0.02 |

We claim:

1. A method for polymerizing one or more olefins comprising the steps of:

selecting a first olefin monomer and optionally one or more alpha-olefin comonomers;

selecting one or more catalyst systems comprising one or more procatalysts comprising a transition metal selected from the group consisting of Ti, V, Hf, Zr, and combinations or mixture of two or more thereof, one or more cocatalysts comprising Al, and one or more self-limiting agents (SLA) selected from the group consisting of a poly(vinyl ester) and a polyether selected from group consisting of poly(ethylene glycol) diester and poly(vinyl ether); wherein the ratio of said SLA to said transition metal (SLA:transition metal) is from 0.1:1 to 30:1, wherein the one or more procatalysts further comprise an electron donor selected from alkyl and cycloalkyl mono-ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms;

polymerizing said first olefin monomer and optionally one or more alpha-olefin comonomers in the presence of said one or more catalyst systems via a slurry polymerization process or gas-phase polymerization process in one or more reactors;

thereby producing one or more olefin-based polymers;

wherein said catalyst system has a loss of least 85 percent of catalyst activity when the temperature is increased from 85 to 110° C.

2. The method of claim 1, wherein said poly(vinyl ester) is selected from the group consisting of poly(vinyl laurate), poly(vinyl myristate), poly(vinyl palmitate), and poly(vinyl stearate).

3. The method of claim 2, wherein said poly(vinyl ester) is poly(vinyl stearate).

4. A catalyst composition comprising one or more catalyst systems comprising one or more procatalysts comprising a transition metal selected from the group consisting of Ti, V, Hf, Zr, and combinations or mixture two or more thereof, one or more cocatalysts comprising Al, and one or more self-limiting agents (SLA) selected from the group consisting of a poly(vinyl ether); wherein the ratio of said SLA to said transition metal (SLA:transition metal) is from 0.1:1 to 30:1, wherein the one or more procatalysts further comprise an electron donor selected from alkyl and cycloalkyl monoethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms.

5. The composition according to claim 4, wherein said SLA is a poly(ethyl vinyl ether).

6. The method according to claim 1, wherein the electron donor is selected from tetrahydrofuran, methyl formate, ethyl acetate, butyl acetate, ethyl ether, dioxane, di-n-propyl ether, dibutyl ether, ethyl formate, methyl acetate, tetrahydropyran, and ethyl propionate.

7. The catalyst composition according to claim 4, wherein the electron donor is selected from tetrahydrofuran, methyl formate, ethyl acetate, butyl acetate, ethyl ether, dioxane, di-n-propyl ether, dibutyl ether, ethyl formate, methyl acetate, tetrahydropyran, and ethyl propionate.

* * * * *